US008455595B2

(12) United States Patent
Dewachter et al.

(10) Patent No.: US 8,455,595 B2
(45) Date of Patent: Jun. 4, 2013

(54) DYNAMIC PRESSURE CONTROL IN DOUBLE LOOP REACTOR

(75) Inventors: Daan Dewachter, Mechelen (BE); Louis Fouarge, Dilbeek (BE); Alain Brusselle, Wilrijk (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 626 days.

(21) Appl. No.: 12/159,302

(22) PCT Filed: Dec. 27, 2006

(86) PCT No.: PCT/EP2006/012534
§ 371 (c)(1),
(2), (4) Date: Jan. 21, 2011

(87) PCT Pub. No.: WO2007/076996
PCT Pub. Date: Jul. 12, 2007

(65) Prior Publication Data
US 2011/0105701 A1    May 5, 2011

(30) Foreign Application Priority Data
Dec. 30, 2005  (EP) .................................... 05028726

(51) Int. Cl.
| C08F 2/00 | (2006.01) |
| C08F 4/44 | (2006.01) |
| C08F 4/72 | (2006.01) |
| F01N 3/20 | (2006.01) |
| B01J 19/00 | (2006.01) |
| B01J 19/18 | (2006.01) |

(52) U.S. Cl.
USPC ............. 526/64; 526/160; 526/170; 422/105; 422/131; 422/132

(58) Field of Classification Search
USPC ..................... 526/64, 160, 170; 422/105, 131, 422/132
See application file for complete search history.

(56) References Cited

U.S. PATENT DOCUMENTS
2005/0272891 A1 * 12/2005 Fouarge et al. ............... 526/943

FOREIGN PATENT DOCUMENTS
| EP | 1603955 | 12/2005 |
| EP | 1611948 A | 1/2006 |

* cited by examiner

Primary Examiner — William Cheung

(57) ABSTRACT

The present invention discloses a slurry loop reactor comprising at least two loop reactors connected in series and wherein the line connecting the two loops is subject to a dynamic pressure difference.

5 Claims, 3 Drawing Sheets

DYNAMIC PRESSURE CONTROL IN DOUBLE LOOP REACTOR

This application is a national stage application under 35 U.S.C. 371 of PCT Application No. PCT/EP2006/012534 having an international filing date of Dec. 27, 2006, which claims benefit of European Patent Application No. 05028726.7 filed Dec. 30, 2005.

This invention is related to the field of olefin polymerisation in double loop reactors.

High density polyethylene (HDPE) was first produced by addition polymerisation carried out in a liquid that was a solvent for the resulting polymer. That method was rapidly replaced by polymerisation under slurry conditions according to Ziegler or Phillips. More specifically slurry polymerisation was carried out continuously in a pipe loop reactor. A polymerisation effluent is formed which is a slurry of particulate polymer solids suspended in a liquid medium, ordinarily the reaction diluent and unreacted monomer (see for Example U.S. Pat. No. 2,285,721). It is desirable to separate the polymer and the liquid medium comprising an inert diluent and unreacted monomers without exposing the liquid medium to contamination so that said liquid medium can be recycled to the polymerisation zone with minimal or no purification. As described in U.S. Pat. No. 3,152,872, a slurry of polymer and the liquid medium is collected in one or more settling legs of the slurry loop reactor from which the slurry is periodically discharged to a flash chamber thus operating in a batch-wise manner. The mixture is flashed in order to remove the liquid medium from the polymer. It is afterwards necessary to recompress the vaporised polymerisation diluent to condense it to a liquid form prior to recycling it as liquid diluent to the polymerisation zone after purification if necessary.

Settling legs are typically required to improve the polymer concentration in the slurry extracted from the reactor; they present however several problems as they impose a batch technique onto a continuous process.

EP-A-0,891,990 and U.S. Pat. No. 6,204,344 disclose two methods for decreasing the discontinuous behaviour of the reactor and thereby for increasing the solids concentration. One method consists in replacing the discontinuous operation of the settling legs by a continuous retrieval of enriched slurry. Another method consists in using a more aggressive circulation pump.

More recently, EP-A-1410843 has disclosed a slurry loop reactor comprising on one of the loops a by-pass line connecting two points of the same loop by an alternate route having a different transit time than that of the main route for improving the homogeneity of the circulating slurry.

The double loop systems are quite desirable as they offer the possibility to prepare highly tailored polyolefins by providing different polymerising conditions in each reactor. It is however often difficult to find suitable space to build these double loop reactors as in the current configuration they need to be close to one another in order to insure adequate transfer of growing polymer from one loop to the other. The average velocity of the material circulating in the transfer line is of less than 1 m/s: these lines must therefore be very short in order to avoid sedimentation and clogging due to the polymerisation of residual monomers. There is thus a need to provide means either to connect two existing reactors that may be distant from one another or to build two new reactors that do not need to be close to one another if available space so requires.

It is an aim of the present invention to provide control means for connecting two or more loop reactors.

It is also an aim of the present invention to decrease the residence time of the material in the line connecting the reactors.

It is yet another aim of the present invention to improve the homogeneity of the flow in the loop reactors.

It is a further aim of the present invention to increase the concentration of olefin in the first reactor.

It is yet another aim of the present invention to increase the solids content.

Accordingly, the present invention discloses a slurry loop reactor comprising at least two loop reactors connected in series and wherein the line connecting the two loops is subject to a dynamic pressure difference.

It is difficult to maintain a constant pressure difference between the two loop reactors, since the control applies to a mixture of batch discharge and continuous operations. The present invention thus discloses a system wherein the pressure in the second reactor is controlled in real time by the pressure variations in the first reactor in order to maintain a predetermined pressure difference.

The present invention provides a method for the slurry polymerisation of olefins that comprises the steps of:
 providing at least two loop reactors connected in series;
 providing a line connecting two loop reactors wherein the line connecting two loops is subject to a dynamic pressure difference;
characterised in that the pressure in the second reactor is controlled in real time by the pressure variations in the first reactor in order to maintain a predetermined pressure difference.

Typical pressure differences are of at most 5 bars, preferably from 0.5 to 2 bars and more preferably from 1.5 to 2 bars. It must be noted that at the end of each dump the pressure difference between the two loops may be greater than or equal to the differential set-point value.

In a first embodiment according to the present invention, the two loop reactors are linked by a conventional line connecting the settling legs of the first reactor to the second reactor.

In another, preferred, embodiment according to the present invention, the two loop reactors are linked a by-pass line (11), as represented in FIG. 1, for connecting two points of the same loop reactor (12) and (13) by an alternate route having a different transit time than that of the main route, said by-pass line (11) also collecting the growing polymer exiting the first loop reactor (1) at exit points (14) and sending said growing polymer to an entry point (13) in the second reactor (2).

In all embodiments, pressure is typically controlled by interaction between a set-point value and dumping of the legs. Each time the set-point value is reached one leg is dumped and consequently, pressure drops to a value that is lower than the set-point value: this is essential to maintain control of the pressure. If the pressure drop is not sufficient, there exists a scenario for recovering control. This type of control is necessary for linking leg dumping that is a batch-wise process, to polymerisation in a loop reactor that is a continuous process.

In prior art, the conventional way of operating the double loop reactor was to work with a static set-point value and with a static differential pressure.

The present invention links the set-point value of the second reactor directly to the process value of the first reactor. It uses a dynamic control system that is able to link the batch-wise dumping process in both reactors to the continuous polymerisation process.

This invention thus allows maintaining the desired differential pressure at all times.

Figure 1:
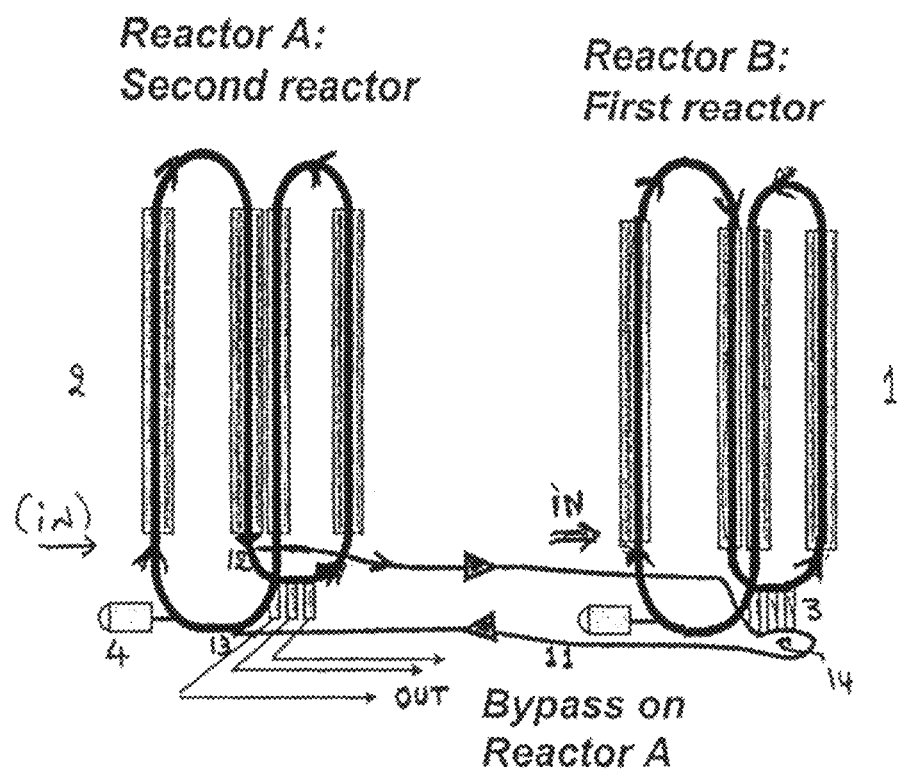
FIG. 1 represents a double loop reactor configuration wherein the two reactors are connected by a by-pass line.
Figure 2:
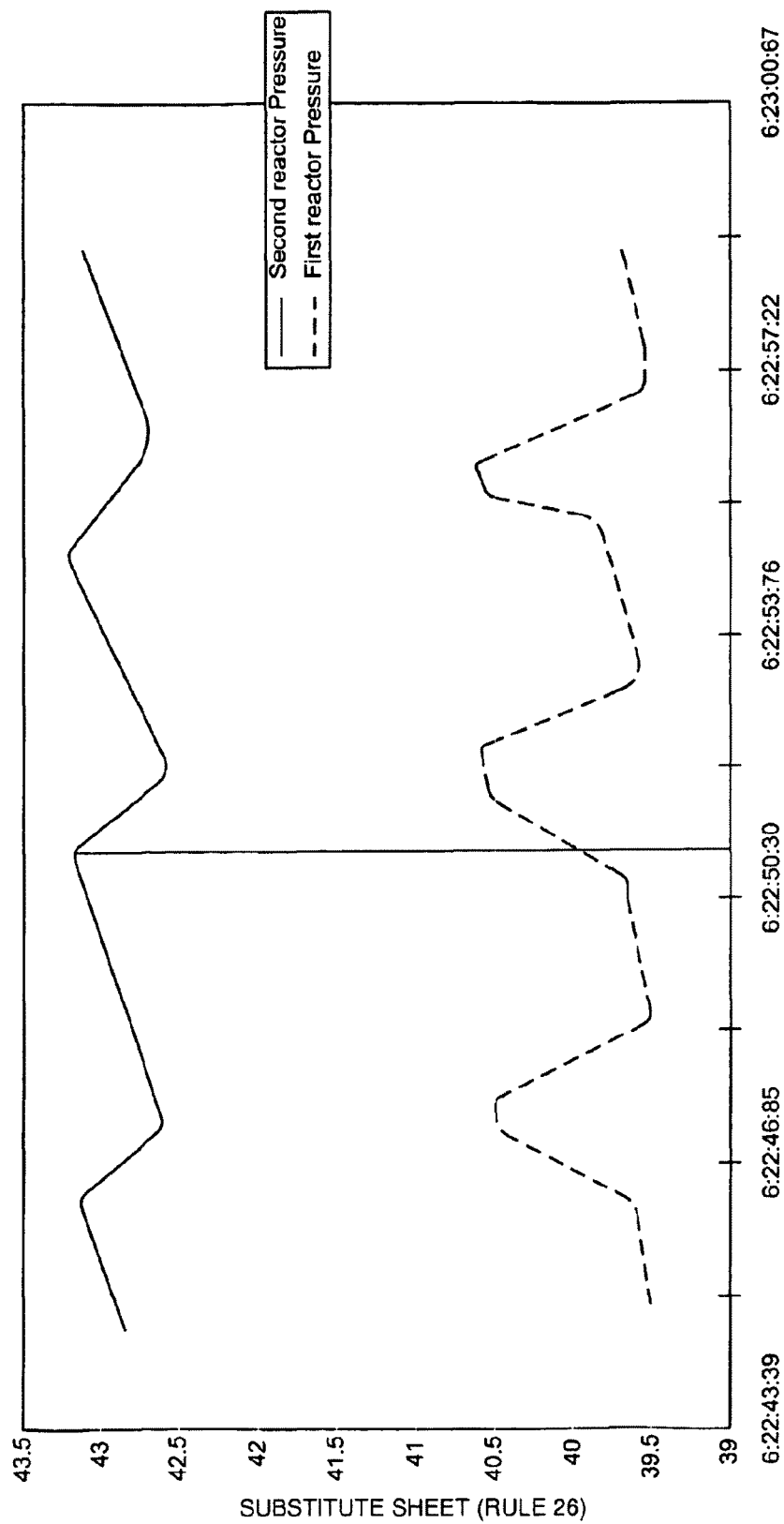
FIG. 2 represents typical pressure profiles, expressed in bars, in the first and second reactors as a function of time expressed in h:min:s.

As a consequence, the dumping dynamic of the second reactor needs to be more constrained than that of the first reactor in order to cope with all the upsets of both the first and second reactors. Typical pressure profiles in the first and second reactors are represented in FIG. 2.

When one leg of the first reactor dumps, the pressure drops in the first reactor and the pressure in the second reactor directly increases while maintaining the differential pressure. When the second reactor reaches the set-point value, that is the actual process value of the first reactor, thus now at a lower pressure than the initial pressure, minus the differential pressure, a leg of the second reactor is fired.

The cycle then re-starts and the pressure in the first reactor increases again.

The growing polymer exiting the first reactor can be collected either by continuous discharge or by settling legs technology. Preferably, settling legs are used.

Throughout the present description the loops forming the slurry loop reactor are connected in series and each loop can be folded.

Optionally, the lines may be jacketed.

When a by-pass line is used, the velocity of the material circulating in the line connecting the loop reactors, must be sufficient to avoid sedimentation and possibly clogging: it must be of at least 3 m/s.

The present invention may be used with all types of catalyst systems. It can be used for the homo- or co-polymerisation of olefins, preferably of ethylene and propylene. It has proven particularly useful for preparing bimodal polymers with metallocene catalyst systems

EXAMPLE

Differential Pressure Control

In normal operations, the pressure in second reactor A was controlled in cascade by the pressure of first reactor B through a differential pressure measurement. This control had a fixed, manually adjustable set-point value that could be varied between 0 and 5 bars.

It was also possible to switch the cascade control on/off manually and start control separately and independently from the bimodal regulation package, in order to allow start-up.

Figure 3:
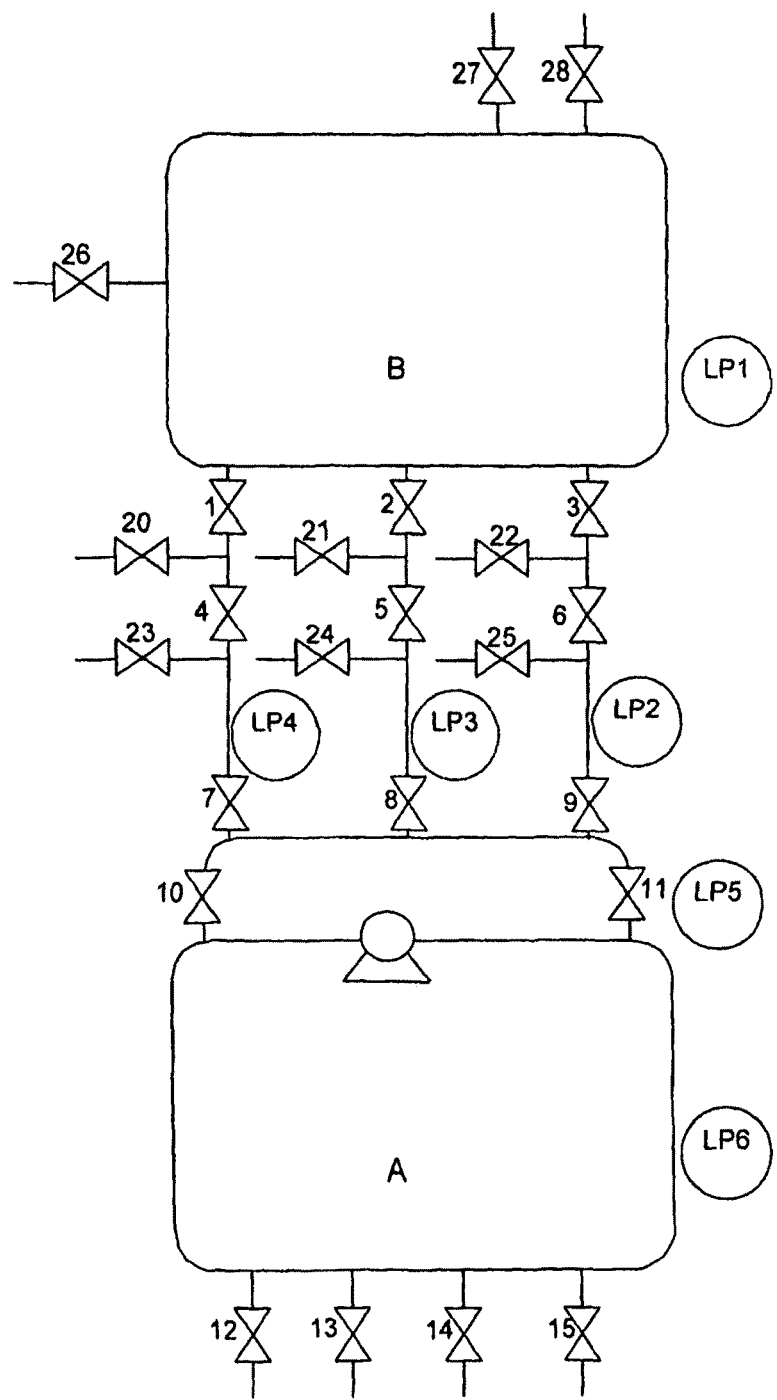
FIG. 3 represents a double loop configuration including the low pressure readings indicated as LPn and the system of valves that can be activated in order to control operations in the reactor.

The general set-up is represented in FIG. 3.

In drift cases, several possibilities were considered and studied.

1. The pressure in second reactor A was too high.

Setting the "Minimum Waiting Time Between Dumps" at 1 second should prevent the increase of pressure in the second reactor. If however said pressure had increased and if the additional criteria described hereafter was not fulfilled then the reactors were killed. These additional criteria were related to the differential pressure. Typically, the differential pressure (DP) set-point value was adjusted between 0.5 and 5 bars. If during operation of the reactors, the differential pressure dropped below half the set-point value for 30 consecutive seconds while the differential pressure control was activated, then both reactors were killed. This was handled by the first differential pressure interlock in the cascade.

2. The pressure in second reactor A was too low.

In this drift case no action was required on differential pressure interlock: it was covered by the low pressure indicator LP6 represented on FIG. 3. If LP6 was lower than 35 barg, then valves 12, 13, 14 and 15 were automatically closed and if it dropped below 30 barg, then valves 10 and 11 were automatically locked.

3. The pressure in first reactor B was too low.

This situation occurred for example when a product take-off (PTO) valve remained blocked in open position. The pressure in first reactor B dropped and so did the pressure in second reactor A. It occurred that the pressure difference remained too high to activate the first differential pressure interlock. The Borsig valve above the blocked PTO was closed if the blockage resulted from a feedback error and if simultaneously, the pressure in second reactor A was smaller than 37 barg for more than 5 s. This was handled by differential pressure interlocks 2, 3 and 4 in the cascade.

In another example according to the present invention, low pressure in first reactor B resulted from low temperature in that reactor. Large amount of hydrogen in the reactor slowed down the reaction thereby reducing the temperature. If the differential pressure control was unable to compensate for such pressure drop in first reactor B, the reactor was killed.

4. The pressure in first reactor B was too high.

This situation was not critical and it was not necessary to implement any specific action.

The invention claimed is:

1. A method for the slurry polymerization of olefins comprising:
    providing a first loop reactor operated at a first pressure;
    providing a second loop reactor operated at a second pressure controlled in real time by variations in the first pressure to maintain a predetermined pressure difference of from 0.5 bars to 2 bars, wherein the first loop reactor and the second loop reactor are connected in series via a line adapted for transferring growing polymer from the first loop to the second loop, wherein the line connecting two loops is subject to a dynamic pressure difference;
    introducing olefin monomer into the first loop reactor;
    contacting the olefin monomer with a first catalyst system within the first loop reactor to form a first polyolefin;
    withdrawing the first polyolefin from the first loop reactor;
    transferring the first polyolefin from the first loop reactor to the second loop reactor via the line;
    contacting the first polyolefin with a second catalyst system within the second loop reactor to form a second polyolefin; and
    withdrawing the second polyolefin from the second loop reactor.

2. The method of claim 1, wherein the first and second loop reactors are linked by a by-pass line for connecting two points of the same loop reactor and by an alternate route having a different transit time than that of the main route, said by-pass line also collecting the growing polymer exiting the first loop reactor at exit points and sending said growing polymer to an entry point in the second reactor.

3. The method of claim 2, wherein the velocity in the by-pass line connecting the two loop reactors is larger than 3 m/s.

4. The method of claim 1, wherein the first loop reactor operates in batch operation.

5. The method of claim 4, wherein the second loop reactor operates in continuous operation.

* * * * *